US006247857B1

United States Patent
Wheeler et al.

(10) Patent No.: US 6,247,857 B1
(45) Date of Patent: *Jun. 19, 2001

(54) MULTISTAGE SYSTEM FOR PROCESSING PHOTOGRAPHIC FILM

(75) Inventors: Christopher E. Wheeler, Fairport; Robert W. Spurr, Rochester, both of NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/371,813

(22) Filed: Aug. 11, 1999

(51) Int. Cl.[7] ............ G03B 13/00; G03B 17/24; G03B 17/26; G03B 27/00; G03B 23/02

(52) U.S. Cl. ............ 396/567; 396/311; 396/511; 396/515; 396/208; 396/599; 355/18; 355/27; 352/72; 352/92

(58) Field of Search ............ 355/18, 27, 40, 355/77; 352/38, 72, 73, 78, 92; 396/207, 208, 211, 213, 284, 387, 511, 512, 515, 552, 567, 599; 348/97

(56) References Cited

U.S. PATENT DOCUMENTS

| 4,806,958 | 2/1989 | Momot et al. ............ 354/21 |
| 4,862,200 | * 8/1989 | Hicks ............ 396/311 |
| 4,938,585 | 7/1990 | Weiffenbach et al. ............ 352/92 |

(List continued on next page.)

OTHER PUBLICATIONS

Texas Instruments, TIRIS™ Radio Frequency Identification Solutions, Product Bulletin, "Tag–it™ Inlays", Jan. 1999.
Texas Instruments, TIRIS™ Radio Frequency Identification Solutions, "TIRIS For Automatic Recognition Of Consumers," Nov. 1998.
Texas Instruments, TIRIS™ Radio Frequency Identification Solutions, "TIRIS Automatic Recognition Of Consumers: Series 5000 Reader System," Feb. 1999.
TIRIS Technology by Texas Instruments™, "Making RFID Work For Work," An Industry Roundtable Hosted By Texas Instruments At NACS–Tech '98.
Texas Instruments Registration and Identification System, TIRIS Technology by Texas Instruments™, Micro–reader, RI–STU–MRD1, Reference Manual, Jul. 25, 1996.
Texas Instruments Registration and Identification System, TIRIS Technology by Texas Instruments™, Description Of Multipage, Selective Addressable & Selective Addressable (Secured) Transponders, General Reference Manual, Aug. 23, 1996.

*Primary Examiner*—Russell Adams
*Assistant Examiner*—Rodney Fuller
(74) *Attorney, Agent, or Firm*—Andrew J. Anderson

(57) ABSTRACT

A system for photographic film processing adapted to access stored information that is related to film processing. An electrically programmable read/write memory contained in a transponder is integrally attached to the film container used at each stage in the film processing chain. The transponder is capable of receiving a first RF frequency electromagnetic field and deriving power and address information from the first frequency, then generating a second RF frequency electromagnetic field in response, where the second electromagnetic field is characteristic of the data stored in memory. A transceiver is disposed within the processing apparatus, connected with an antenna and support components for polling each transponder. As instructed by a control logic processor, the transceiver communicates with the transponder to both read stored data from the transponder, such as manufacturing data for the film, and store usage and processing data to the transponder for storage in memory.

20 Claims, 7 Drawing Sheets

U.S. PATENT DOCUMENTS

| | | | | |
|---|---|---|---|---|
| 5,003,333 | * | 3/1991 | Earnhart | 396/515 |
| 5,144,314 | * | 9/1992 | Malmberg et al. | 342/44 |
| 5,153,625 | * | 10/1992 | Weber | 396/284 |
| 5,389,992 | * | 2/1995 | Weber | 396/387 |
| 5,434,572 | * | 7/1995 | Smith | 342/44 |
| 5,557,085 | * | 9/1996 | Tyren et al. | 235/380 |
| 5,572,271 | * | 11/1996 | Pelican | 396/512 |
| 5,574,470 | * | 11/1996 | De Vall | 343/895 |
| 5,642,285 | | 6/1997 | Woo et al. | 364/449.7 |
| 5,659,833 | * | 8/1997 | FitzGerald | 396/512 |
| 5,678,083 | * | 10/1997 | Imura et al. | 396/310 |
| 5,710,617 | * | 1/1998 | Inuiya | 355/32 |
| 5,809,358 | * | 9/1998 | Weber | 396/511 |
| 6,099,178 | * | 8/2000 | Spurr et al. | 400/207 |
| 6,106,166 | * | 8/2000 | Spurr et al. | 396/578 |

\* cited by examiner

MULTISTAGE SYSTEM FOR PROCESSING PHOTOGRAPHIC FILM

FIELD OF THE INVENTION

This invention generally relates to a multistage system for processing of photographic film (including, e.g., exposure, development, modification, and printing steps), and more particularly relates to a system for and method of recording, accessing and transmitting information during various steps in such a multistage system. In a particular embodiment, this invention specifically relates to multistage motion picture and television film production systems.

BACKGROUND OF THE INVENTION

There are many stages in the conventional production process or "imaging chain" that begins with the manufacture of motion picture and television film and culminates in the production of feature films, television programs, and commercials. Apparatus that handle film at various stages of this process include numerous types of cameras, film magazines, photoprocessing equipment, editing equipment (including special effects), telecine machines, and intermediate and final film printing apparatus. The production process also requires, at several stages throughout the imaging chain, the input of creative and technical individuals who add value to the film content throughout the entire pre-production, production, and post-production process. Consequently, there is a desire to provide improved methods for communication between the people involved in various stages of the film production process, whereby useful information for film processing may be conveniently exchanged.

Scene information is initially recorded in a photographic film by exposing an origination film (e.g., a camera color negative film). Color negative films are a class of photosensitive materials that (after photographic development) map the luminance (neutral) and chrominance (color) information of a scene to complementary tonal and hue polarities in the negative film. Light areas of the scene are recorded as dark areas on the color negative film, and dark areas of the scene are recorded as light areas on the color negative film. Colored areas of the scene are recorded as complementary colors in the color negative film: red is recorded as cyan, green is recorded as magenta, blue is recorded as yellow, etc. In order to render an accurate reproduction of a scene, a subsequent process is necessary to reverse the luminance and chrominance information back to those of the original scene. This subsequent process may or may not require another photosensitive material. In the motion picture industry, there are two common subsequent processes. One such subsequent process is to optically print (by contact or optics) the color negative film onto another negative working photosensitive material, such as Eastman Color Print Film 5386™, to produce (after photographic development) a color positive image suitable for projection, or an intermediate film to produce a master positive, which may be used to subsequently produce a duplicate negative by again printing on an intermediate film. Another subsequent process in the motion picture industry is to transfer the color negative film information directly into a video signal using a telecine transfer device, or indirectly by first making a positive photographic print and then transferring the print film information into a video signal using such a device. Various types of telecine transfer devices are described in Engineering Handbook, E. O. Fritts, Ed., 8th edition, National Association of Broadcasters, 1992, Chapter 5.8, pp. 933–946, the disclosure of which is incorporated by reference. The most popular of such devices generally employ either a flying spot scanner using photomultiplier tube detectors, or arrays of charged-coupled devices, also called CCD sensors. Telecine devices scan each negative or positive film frame transforming the transmittance at each pixel of an image into voltage. The signal processing then inverts the electrical signal in the case of a transfer made from a negative film in order to render a positive image. The signal is carefully amplified and modulated, and fed into a cathode ray tube monitor to display the image reproduction, or recorded onto magnetic tape for storage. Prior to or after such subsequent processes, films with recorded scene images may be subjected to various additional processing steps, including editing and special effects addition.

There are a number of conventional methods for communicating between different individuals who are responsible for film processing at various stages in the imaging chain. Traditionally, an assistant cameraman (AC) prepares a written camera report that includes production information such as footage counts for scenes and takes, identification of acceptable takes, framing, film type and emulsion, lighting temperature, filtration, T-stop, camera frame rate, special processing requests, color balance, telecine transfer preferences and similar related information. The written camera report is typically provided in duplicate, with a copy retained by the AC as a backup record, and a copy or copies attached to the film canister that contains the exposed, but undeveloped film. This written camera report is ultimately used by the processing lab. This report typically goes to a color timer if the negative is printed after processing and may alternately go to a colorist if the negative is to be transferred using a telecine device.

Conventional hand-written camera reports of this type are widely used and provide the basic information needed for efficient processing of the film. However, there are a number of disadvantages to these reports. Legibility and clarity can easily vary from one report to another. More importantly, a report can become separated from the film canister to which it is originally attached. This could mean loss of valuable information or even the wrong information provided for a particular reel of film. Furthermore, report information is typically limited to camera and capture (exposure) information. Other data typically not provided in the report could be useful in subsequent film processing, such as film sensitometry, film manufacture ID, and emulsion data.

As another alternative method for communication of film and processing data, some motion picture camera manufacturers offer a laptop camera controller (LCC) for remote control of camera operation such as exposure control, shutter angle transport speed and accounting report generation. The LCC can be used to generate manual or automatic camera report information in an electronic file (e.g. ASCII, Windows NT) which can then be printed, faxed or electronically transferred to processing and post production facilities. In many ways, this system provides a good alternative to hand-written camera reports. However, with this alternate method, the digitally encoded information is not attached to the film, but takes a different path to arrive at the film processing facility. Moreover, the electronic file that is provided gives information up to the point where the film is exposed in the camera. Relative to the overall imaging chain, there is no further modification of this file data after it is transferred to the production lab.

Film manufacturers provide yet another alternative method for communicating information relevant to film processing using a "keycode". Written near the edge of the film, a human- and machine-readable alphanumeric and barcode system provides information on film code and emulsion identification, and provides footage and frame counts corresponding to the images on the film. An industry standard for this keycode system exists and this system is conventionally used in the motion picture production chain. The keycode information is written in the photosensitive layers near the edge of the film according to SMPTE (Society of Motion Picture and TV Engineers) specification using a laser or light emitting diode (LED) device. The latent keycode image is developed during film processing into either an optical human-readable or machine-readable barcode. This keycode information can then be used in the editing, color timing and telecine transfer processes to identify and select frame positions for splicing, color timing changes such as printer light changes and fades and dissolves, and sound synchronization points in an on-line or off-line editing system.

The keycode system, since it follows an industry standard, is well-known in motion picture processing and provides very valuable information for the editing and color timing processes. This system is very useful for providing a frame search, identification and orientation process to make reliable and accurate cuts when performing on-line, off-line and final negative cutting edits. Furthermore, with the manufacturer's ID information incorporated into the keycode, tracking information is retained in the film should it be necessary in the future. However, relative to the overall imaging chain, this system has its limitations. The main disadvantage of the keycode system is that its information is limited to film code, film emulsion, and footage and frame count information. The system does not provide a means to communicate technical and artistic information from a film cinematographer to a processing lab, color timer, colorist, or telecine operator.

Timecode systems also provide some of the information useful to motion picture film photoprocessing. Originally developed for the video market, timecode methods have been implemented to allow for simpler post production sound and image synchronization, especially for multi-camera film capture. Conventional systems of this type include both standard timecode systems such as the SMPTE and proprietary systems such as Aatoncode™ (Aaton, Inc., Grenoble, France) and FIS™ (Arri, Munich, Germany). While these systems are not identical, they all operate on the same basic principle, keeping very accurate real or relative time synchronization when using multiple cameras and audio and video tape recorders. For film, these systems write a machine-readable code that synchronizes each frame of a motion picture negative. Some timecode systems also periodically write reference marks and human-readable timecode to the film. This reference, written to the image layers of the film by an LED or similar type of device, becomes a permanent part of the negative film once it is developed. Both the machine- and human-readable timecoded images can thereby be used in the editing process, making it easier to find and edit together sound and images recorded from different devices.

Disadvantages of timecode systems include their inability to record information other than time and frame counts. For example, using a timecode system, such data as camera, exposure, lighting conditions and other information must still be provided on a hand-written camera report. Emulsion data and manufacturing information is not available with this method of data encoding. Furthermore, because the timecode information is written in an optical fashion to the photosensitive layer of the film, any data provided using this encoding method is not available, in either human- or machine-readable form, until the film is developed. Thus, while timecode information is available for post production processes such as color timing and telecine transfer, it is not available as an input for the lab processing stage.

Magnetics On Film (MOF) techniques have been used successfully for information storage in some types of consumer film applications. Using MOF technology, a magnetic layer is provided in the manufacturing process of the film support. This layer, usually containing some type of iron oxide or other metal oxide, provides a medium in which information can be stored. By incorporating magnetic heads in cameras, processors, telecine apparatus, and other processing equipment, information pertinent to the film image capture, such as that included in camera reports, can be written to the film. This machine-readable information can then be accessed from downstream magnetic readers for use in post-production processes.

MOF methods present an alternative for incorporating both camera report and time-code and footage frame count information directly onto the film. However, MOF systems are complex to manufacture and are therefore costly. MOF use requires manufacture of the film support (base) in a manner that is substantially more complex than is used in present manufacturing systems. Additionally, use of MOF technology requires that numerous manufacturers incorporate magnetic read/write heads on various equipment used throughout the production and post production processes. For these reasons, MOF is not an economically viable system for motion picture manufacture.

Still another method for communicating film information includes providing information in the form of reference exposures on the film itself. For example, a cinematographer may record a reference exposure in a color negative film image using the motion picture camera in order to communicate exposure and/or color timing information to a colorist or color timer. Typically, such information is often limited to lighting conditions, exposure, and reference exposure conditions. This system can communicate some information to a colorist. However, this method does not eliminate the need for supplemental verbal or written communication, such as to alert the colorist or color timer that information is incorporated in a specific image field and in a specific roll, for example.

Other limited methods are also available which provide some information for film processing. A cinematographer may record special instructions to a colorist or color timer via an audio cassette recorder. This system is not widely used as it requires audio cassette playback capability and is susceptible to the many quality problems associated with small and handheld audio cassette recorders. U.S. Pat. No. 5,642,285 (Woo et al) teaches the use of a Global Position Satellite (GPS) navigation receiver for communicating frame-by-frame camera position estimates and timecode information for use in filming special effects. However, this method is restricted to timecode information and does not provide for user specified input fields to incorporate image information for communication during the production and post production processes. U.S. Pat. No. 4,938,585 (Weiffenbach et al) teaches the use of an image pulse generator mounted in a camera to record information about an image electro-optically onto the camera negative film and a reference signal identifying the image for which information was recorded. The subsequent information is then accessed in an auxiliary memory database. This method provides only a limited amount of bit storage for user specified fields other than timecode information and also requires expensive auxiliary data storage and access devices in the post production equipment.

The best method for providing information about the motion picture film would support the additive operations of numerous individuals who contribute to the development of the film throughout various stages of the imaging chain.

As noted above, none of the conventional methods used meet all of these requirements: (a) supports each process in the imaging chain, from manufacture, to image capture, to film development and printing, to post-production processing, allowing information to be used and updated at any stage in the chain and transmitted to subsequent stages; (b) provides data integrally attached to the film or film carrier, to prevent loss of the information; (c) allows contactless access to information; (d) does not require information written onto the film itself; and (e) is economically feasible, working with existing equipment infrastructure with little required modifications.

It can be seen, therefore, that there is a need for an efficient method for storing and transferring information about photographic film processing at each stage in the imaging chain, especially for motion picture film productions.

SUMMARY OF THE INVENTION

It is an object of the present invention to provide a system for multistage photographic film processing that enables efficient and convenient access to stored information related to film processing.

In accordance with one embodiment of the invention, a multistage system for processing photographic film is disclosed comprising: (a) a first film processing subsystem wherein photographic film is wound on a first film spool, which first film spool with wound photographic film is used as a supply spool for a subsequent film processing subsystem; (b) a first transponder associated with the first film spool, said first transponder coupled with a memory having data stored therein indicative of film processing information, said first transponder capable of receiving a first electromagnetic field and generating a second electromagnetic field in response to the first electromagnetic field received thereby, the second electromagnetic field being characteristic of the data stored in the memory; (c) a second film processing subsystem wherein film processed in the second film processing subsystem is wound on a second film spool; (d) a second transponder associated with the second film spool, said second transponder coupled with a second memory capable of having data stored therein indicative of film processing information, said second transponder capable of receiving a third electromagnetic field and generating a fourth electromagnetic field in response to the third electromagnetic field received thereby, the fourth electromagnetic field being characteristic of the data stored in the second memory; and (g) at least one transceiver for transmitting said first electromagnetic field and for sensing said second electromagnetic field, thereby allowing data to be read from the memory coupled with the first transponder, and for transmitting data read from the first transponder to the second transponder.

In accordance with another embodiment of the invention, a method for recording, accessing, and transmitting information during multiple stages of a photographic film processing system is disclosed comprising the steps of: (a) performing a first film processing step wherein photographic film is wound on a first film spool, which first film spool with wound photographic film is used as a supply spool for a subsequent film processing step; (b) recording data indicative of film processing information in a memory coupled with a first transponder associated with the first film spool, said first transponder capable of receiving a first electromagnetic field and generating a second electromagnetic field in response to the first electromagnetic field received thereby, the second electromagnetic field being characteristic of the data stored in the memory; (c) performing a second film processing step wherein film processed in the second film processing step is wound on a second film spool, where the second film spool has a second transponder associated therewith, said second transponder coupled with a second memory capable of having data stored therein indicative of film processing information, said second transponder capable of receiving a third electromagnetic field and generating a fourth electromagnetic field in response to the third electromagnetic field received thereby, the fourth electromagnetic field being characteristic of the data stored in the second memory; (d) reading data from the memory coupled with the first transponder with a transceiver which transmits said first electromagnetic field and which senses said second electromagnetic field, thereby allowing data to be read; and (e) writing data received from said first transponder to said second transponder.

According to a specific embodiment of the present invention, the multistage processing system includes use of a supply spool for film, which is adapted to provide information about the film wound thereon. The supply spool may include a non-volatile memory, such as an EEPROM (Electrically Erasable Programmable Read-Only Memory) semiconductor component integrally contained in a transponder. Stored in the EEPROM are encoded data which may be indicative of manufacture, processing conditions, and operations performed on the film. Similarly, a take-up spool for a processing subsystem also includes a non-volatile memory integrally contained in a transponder.

Each transponder is capable of receiving a first electromagnetic field generated by a radio frequency transceiver unit. Each transponder provides power to its semiconductor circuitry as the transponder receives the first electromagnetic field. When the transponder circuitry is powered, the component generates a second electromagnetic field in response to the first electromagnetic field. The second electromagnetic field contains data stored in the memory. The radio frequency transceiver unit senses the second electromagnetic field and extracts the data content for processing by a control logic processing unit that operates the film processing apparatus.

A feature of the present invention is the provision of a radio frequency transceiver capable of transmitting a first electromagnetic field to be intercepted by a transponder having data stored therein indicative of film processing, the transponder capable of generating a second electromagnetic field to be sensed by the radio frequency transceiver.

A further feature of the present invention is the ability of the radio frequency transceiver to address a specific transponder component and write data to that component, where the data written is indicative of usage of a specific spool of film.

It is an advantage of the present invention that it obviates the need for manual entry of information on a form such as a camera report, since the same information can be stored and accessed electronically.

It is a further advantage of the present invention that the information provided can be integrally attached to a film core or spool. Furthermore, information can be transferred from one spool to another, such as from a supply spool to a take-up spool, without manual handling of memory components.

It is a further advantage of the present invention that it allows storage of cumulative data obtained at multiple stages of film processing, beginning with data obtained when the film is manufactured and culminating with data on the final print processing performed on the film.

It is a further advantage of the present invention that it allows contactless data access, requiring no physical contact between a transceiver and the film or film packaging.

It is yet a further advantage of the present invention that it stores information in such a way that the information can be accessed even where the film has not been developed.

It is yet a further advantage of the present invention that it provides a method for data access that is fully backward-compatible with existing methods for storing data relevant to film processing. The invention can, for example, be combined with any of the existing manual, optical encoding, or magnetic encoding methods currently employed for storing film processing data. Film that is adapted according to this invention can be provided for use in a processing apparatus that has not yet been adapted with a transceiver in order to use this invention.

These and other objects, features, and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

Figure 1:
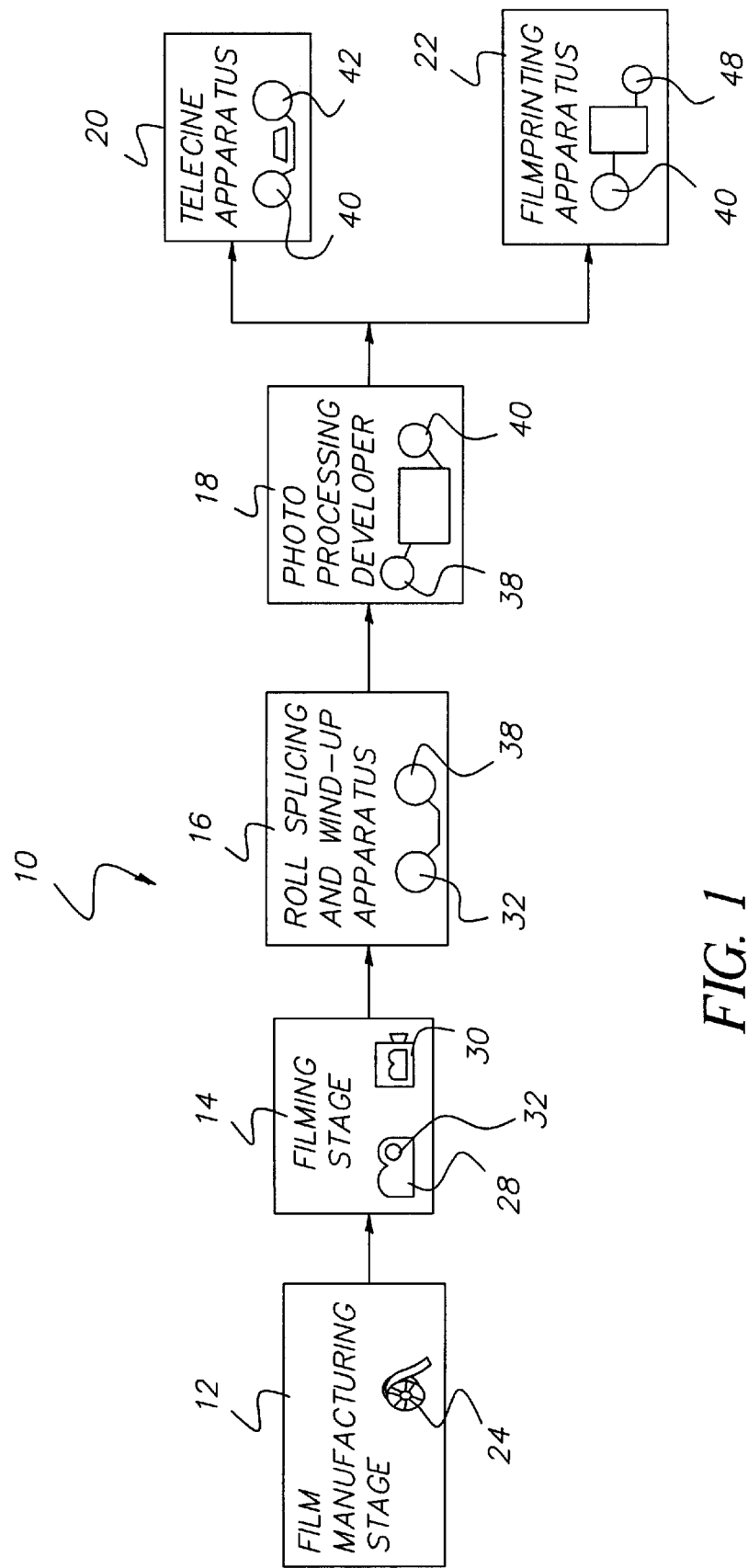
FIG. 1 is a block diagram overview showing an imaging chain for motion picture film processing.

The present description is directed in particular to elements forming part of, or cooperating more directly with, subsystems or steps performed in accordance with the invention. It is to be understood that elements not specifically shown or described may take various forms well known to those skilled in the art. For the description that follows, the general term "imaging chain" is used to describe a sequence of sub-processes employed in the overall process that takes as its input raw, manufactured photographic film, processes the film, and provides as its output developed film that can be used for viewing. FIG. 1 shows key stages in an imaging chain, generally numbered 10.

For the description that follows, the general term "film processing" is used to comprise any handling of film and any processing operation performed on the film by any apparatus in imaging chain 10. In this sense, film processing is performed by devices that manufacture film, that wind or package unexposed or exposed film at various stages in imaging chain 10, that expose film, that develop exposed film, that print onto unexposed film (e.g., color negative, color intermediate, or color print film) using the developed film as a master, or that read developed film as input to a telecine apparatus. As is described below, each film processing apparatus in imaging chain 10 incorporates a film processing subsystem that performs an operation on the film.

Referring to FIG. 1, imaging chain 10 begins with a film manufacturing stage 12. Numerous quality control and testing measures performed during film manufacturing stage 12 assure the end-user of a quality film product that will provide predictable response under given conditions. Manufacturing data on each film emulsion, such as detailed sensitometry data, can be useful in later stages of imaging chain 10.

A filming stage, generally numbered 14 in FIG. 1, comprises the steps required to load the film into a camera 30, typically using a film magazine 28. In filming stage 14, film is exposed under controlled conditions to achieve desired aesthetic affects. Exposed film is then processed in a roll splicing and wind-up apparatus 16. This readies the exposed film for development in a photoprocessing developer stage 18. Developed film then serves as a master copy and typically goes to a telecine apparatus 20 for reading and recording on video tape and/or to a film printing apparatus 22 for reproduction on a print or intermediate photographic film.

The invention enables the recording, accessing, and transmitting of information during multiple stages of a photographic film processing system wherein such information is transmitted from film input spools to take-up spools during each processing stage. In a series of processing stages or steps wherein the film is transferred in sequence from supply spools to take-up spools, the take-up film spool with wound photographic film for a preceding stage may be used as the supply spool for a subsequent processing stage or step performed thereafter, where data read from a first transponder associated with a feed spool is rewritten on and reread from one or more intermediate transponders associated with each intermediate film spool used in sequence in the multistage system, thereby maintaining association of the data read from the first transponder with film transferred to take-up spools at the end of each film processing stage or step. Additional data associated with an intermediate processing subsystem may be added to the data read from the first transponder and transmitted to a subsequent transponder associated with a subsequent film spool. The transferred information may be used in each intermediate processing stage or step, or in a final processing stage or step to control a processing subsystem.

It should be noted that there can be numerous variations to the stages shown in imaging chain 10 as depicted in FIG. 1 and as described above. The invention can be applied in any one or more of these stages and allows a substantial amount of variation, as will be understood by those familiar with the motion picture film developing art. For example, editing operations may be performed in additional subsystems on exposed and developed negative, print or intermediate films, including special effects editing, and such edited films may then be subjected towards additional printing and/or telecine transfer operations. In each case, the films being processed are typically transferred from a supply film reel to a take-up film reel, and the invention allows for recording, accessing, and transmitting information concerning film processing at each stage in the overall process.

Figure 2:
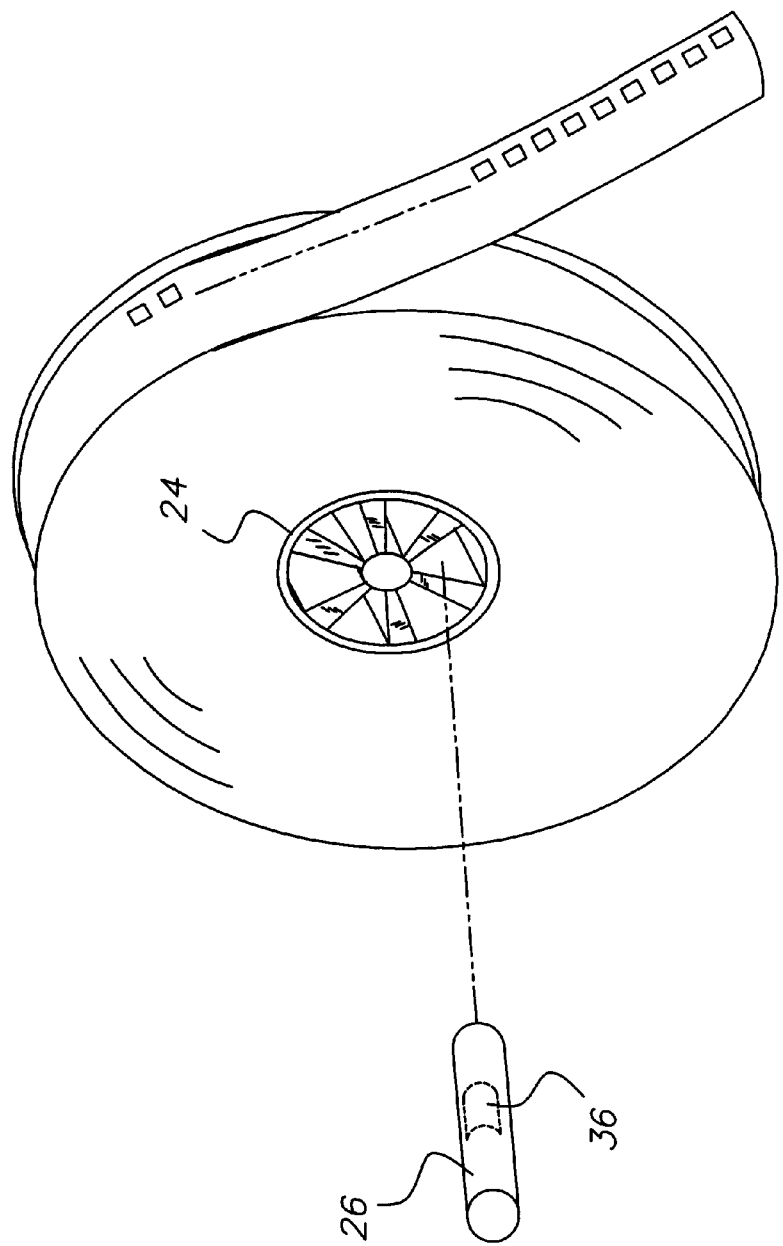
FIG. 2 is a perspective view showing a memory device attached to a film reel core.

FIG. 2 shows how the present invention attaches a memory 36 to a film core 24 in film manufacturing stage 12. Memory 36 is integrally attached to a transponder 26. Transponder 26 can be, for example, a "SAMPT" (Selective Addressable Multi-Page Transponder), part number "RI-TRP-IR2B" available from Texas Instruments, Incorporated, located in Dallas, Tex. Alternately, transponder 26 may be a "Model TL5550"™ transponder, available from Vishay-Telefunken Semiconductors, Incorporated, located in Malvern, Pennsylvania. Or transponder 26 could be a low-profile device such as a "TAG-IT™ Inlay" also available from Texas Instruments, Incorporated. Transponder 26 is small relative to the size of film core 24; the capsule-shaped SAMPT transponder, as one example, is less than 32 mm in length and less than 4 mm in diameter. This compact packaging allows transponder 26 to be taped or glued unobtrusively into an open area of film core 24.

Figure 3:
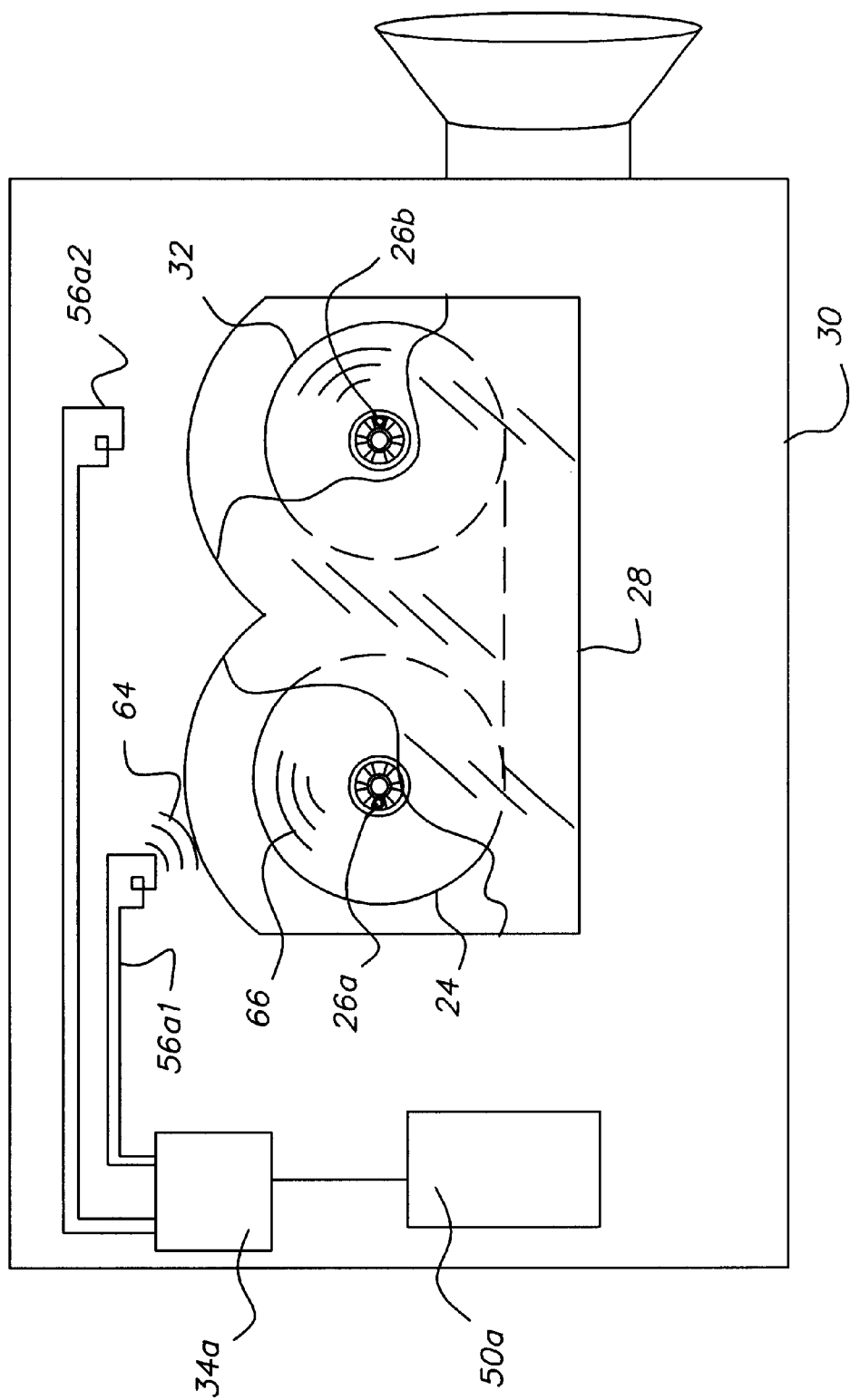
FIG. 3 is a side view with a partial cutaway showing a film magazine as adapted for use in accordance with the invention, loaded into a motion picture camera.

The attachment method for transponder 26 containing memory 36 can be used repeatedly in each stage of imaging chain 10 for film contained in a supply or take-up spool or reel. FIGS. 3–7 show how transponders 26a/b/c/d/e/f/g are used with this arrangement to support continuous information storage and transfer throughout each stage in imaging chain 10. At each of these stages, a transceiver 34a/b/c/d/e communicates with corresponding transponder 26a/b/c/d/e/f/g to read and write data to memory 36 contained in each transponder 26a/b/c/d/e/f/g. Transponders 26a/b/c/d/e/f/g are low-power devices that derive their source power from the first electromagnetic field 64 emitted by transceiver 34a/b/c/d/e as is represented in FIG. 3.

Transceiver 34a/b/c/d/e may be a "Model S2000" transceiver available from Texas Instruments, Incorporated, located in Dallas, Tex. Alternatively, transceiver 34a/b/c/d/e may be a "Model U2270B" transceiver available from Vishay-Telefunken Semiconductors, Incorporated, located in Malvern, Pa. Transceiver 34a/b/c/d/e serves as an electromagnetic "reader" and is capable of transmitting a first electromagnetic field 64 of a first predetermined radio frequency. Transceiver 34a/b/c/d/e is also capable of receiving a second electromagnetic field 66 of a second predetermined radio frequency. Typically, the same frequency serves for both the first and second electromagnetic fields 64 and 66.

As FIG. 3 illustrates, transceiver 34a communicates, via an antenna 56a1, with a transponder 26a. A separate antenna 56a2 is used for communication with a transponder 26b. Selection of the specific antenna (multiplexing) is performed by circuitry within a transceiver 34a. Alternate multiplexing or polling schemes could also be employed for allowing communication with a single transponder 26a or 26b at a time. Other solutions include, but are not limited to, use of an external multiplexing switch to connect a single antenna at a time, use of a plurality of microreader modules (such as a "RI-STU-MRD1 Micro-reader" from Texas Instruments, Inc.) where a microreader module is disposed near the location of each transponder 26a/b/c/d/e/f/g, or use of a "non-collision" algorithm. In a "non-collision" algorithm, transceiver 34a/b/c/d/e successively communicates with multiple transponders 26a/b/c/d/e/f/g using a sequence of increasing signal strengths and using the capability of transceiver 34a/b/c/d/e to selectively address and communicate with each transponder 26a/b/c/d/e/f/g, and then to selectively disable each transponder 26a/b/c/d/e/f/g individually. Selective addressing can also be used, as described subsequently.

It is instructive to note how transceiver 34a/b/c/d/e communicates with transponder 26a/b/c/d/e/f/g, disposed at a nearby location within a processing apparatus (as shown in FIGS. 3–7). Transponder 26a/b/c/d/e/f/g is tuned to the RF carrier frequency emitted by transceiver 34a/b/c/d/e. Upon receiving an initial RF signal from transceiver 34a/b/c/d/e, transponder 26a/b/c/d/e/f/g circuitry obtains, from the emitted electromagnetic energy, sufficient energy to provide source voltage for its internal circuitry. Thus, no battery is needed to separately power transponder 26a/b/c/d/e/f/g.

Each transponder 26a/b/c/d/e/f/g is individually programmed with an unique identifying address code (ID). As a final stage in manufacture, transponder 26a/b/c/d/e/f/g is programmed to store its ID along with other data in some cases (such as data characteristic of film to which transponder 26a or 26f may be attached).

Transceiver 34a/b/c/d/e has both read and write access to transponder 26a/b/c/d/e/f/g memory data. To communicate with an individual transponder 26a/b/c/d/e/f/g, transceiver 34a/b/c/d/e encodes the unique identifying address code as part of its emitted signal, along with a command to read data from or to write data to ("program") transponder 26a/b/c/d/e/f/g. Transponder 26a/b/c/d/e/f/g responds to transceiver 34a/b/c/d/e communication only when it has been addressed correctly. This selective address mechanism can allow transceiver 34a/b/c/d/e to specifically address one individual transponder 26a/b/c/d/e/f/g at a time and help to avoid interference signals from a nearby transponder 26a/b/c/d/e/f/g that might be inadvertently activated by the received signal from transceiver 34a/b/c/d/e.

In addition to selective addressing, there are other data security options available with the SAMPT device used for transponder 26a/b/c/d/e/f/g in the preferred embodiment. Individual memory blocks or "pages" can be separately locked to prevent inadvertent overwriting of stored data. Commands are available to allow access to individual pages only, so that transceiver 34a/b/c/d/e can be permitted to read or write only specific data from transponder 26a/b/c/d/e/f/g.

As is shown in FIGS. 3–7, each transceiver 34a/b/c/d/e is electrically coupled to a corresponding control logic processor 50a/b/c/d/e by means of a standard interface (such as, for example, RS-232C serial connection). Control logic processor 50a/b/c/d/e is used to process the data written to or read from memory 36. Control logic processor 50a/b/c/d/e can be a self-contained microprocessor-based controller, for example, or can be an intermediate interface circuit that allows connection of the processing apparatus with an external computer.

Image Chain 10 Processing

Referring to FIG. 3, in a camera 30, a film magazine 28 contains the raw, unexposed film on film core 24. Supply core transponder 26a is provided on film core 24 and includes data from the film manufacturer, as described subsequently. A camera film take-up core 32 is similarly equipped with a camera film take-up core transponder 26b. As instructed by command from a camera control logic processor 50a, a camera transceiver 34a, using an antenna 56a1, reads stored data on film manufacture from core transponder 26a. Camera control logic processor 50a, based on this stored data, is capable of adjusting operation of camera 30. Using an antenna 56a2 and camera transceiver 34a, camera control logic processor 50a records the information read from supply core transponder 26a onto camera film take-up core transponder 26b. Camera control logic processor 50a also has the capability to add data on film exposure conditions and related information as described subsequently.

Figure 4:
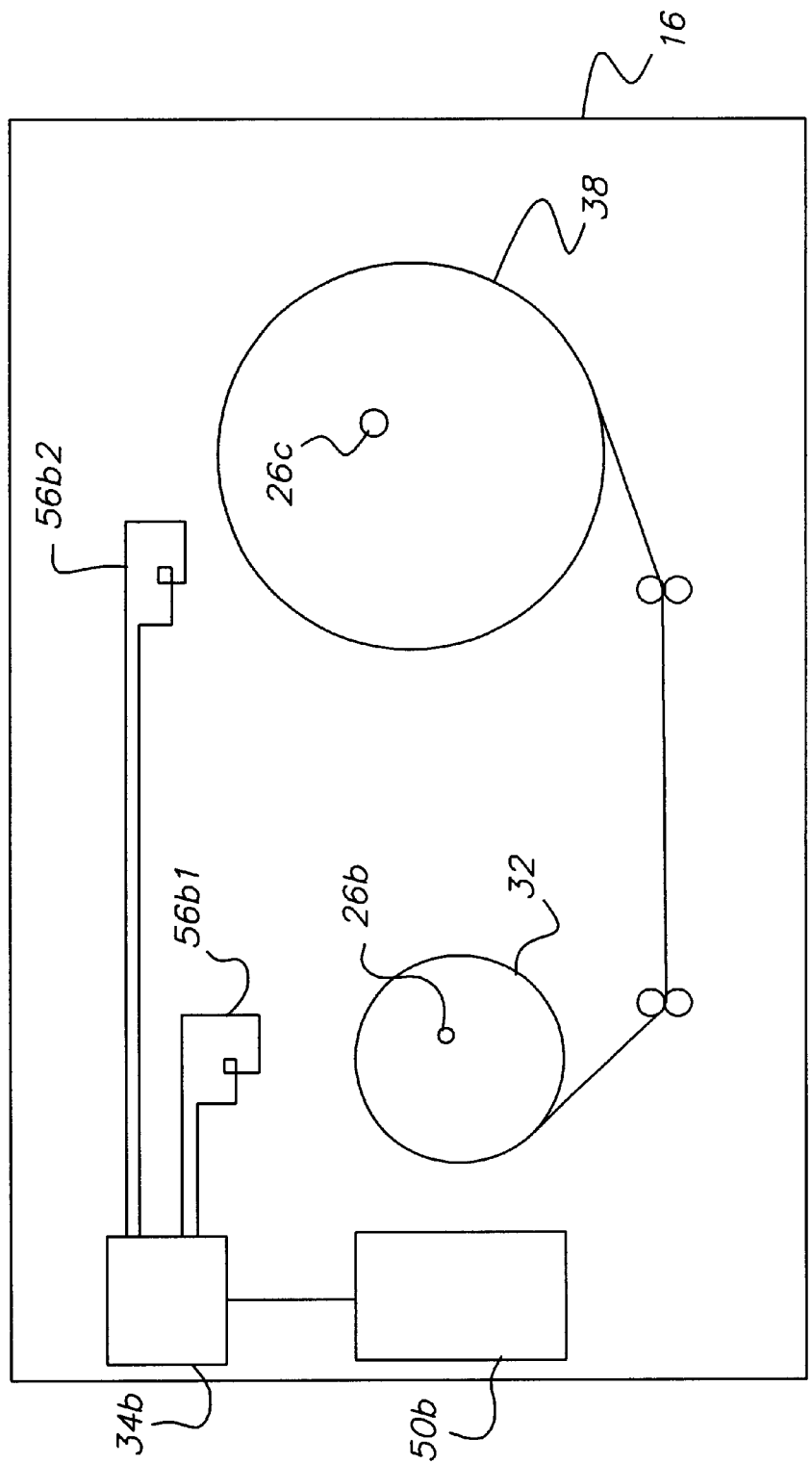
FIG. 4 is a side view showing a roll splicing and wrap-up apparatus adapted for use in accordance with the invention.

Referring to FIG. 4, the exposed film, wrapped onto camera film take-up core 32, goes to roll splicing and wind-up apparatus 16. Here, the film is wound onto a large take-up roll 38. A roll splicing and wind-up apparatus control logic processor 50b instructs a roll splicing and wind-up apparatus transceiver 34b, using an antenna 56b1 to read stored data from camera film take-up core transponder 26b. Then, using an antenna 56b2, control logic processor 50b instructs a roll splicing and wind-up apparatus transceiver 34b to transfer this data to a large take-up roll transponder 26c.

Figure 5:
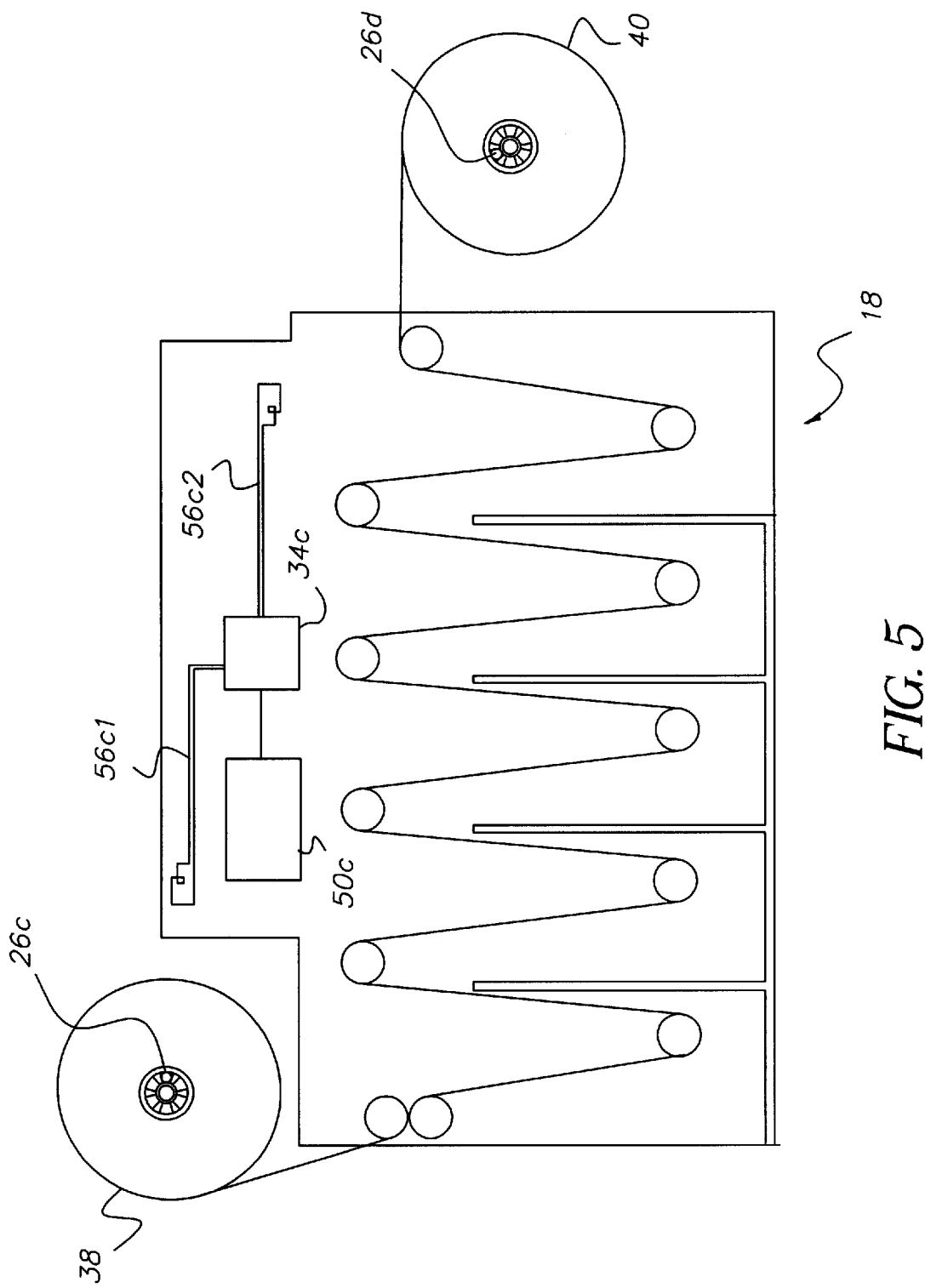
FIG. 5 is a block diagram showing a photoprocessing developer apparatus adapted for use in accordance with the invention.

Referring to FIG. 5, large take-up roll 38 provides the exposed, undeveloped film as input to photoprocessing developer apparatus 18. Photoprocessing developer apparatus 18 routes the film through its film processing subsystem that comprises successive chemical baths and a drying cycle, as is well-known in the film developing art, and onto a take-up reel 40. A photoprocessing developer apparatus control logic processor 50c instructs a photoprocessing developer apparatus transceiver 34c, using an antenna 56c1, to read stored data from large take-up roll transponder 26c. Photoprocessing developer apparatus control logic processor 50c, based on this stored data, is capable of adjusting operation of photoprocessing developer apparatus 18. After the film is developed and dried, it is wrapped onto a take-up reel 40. Using an antenna 56c2 and photoprocessing developer apparatus transceiver 34c, photoprocessing developer apparatus control logic processor 50c records the information read from large take-up roll transponder 26c onto a take-up reel transponder 26d. Photoprocessing developer apparatus control logic processor 50c also has the capability to add data on film development conditions and related information as described subsequently.

Figure 6:
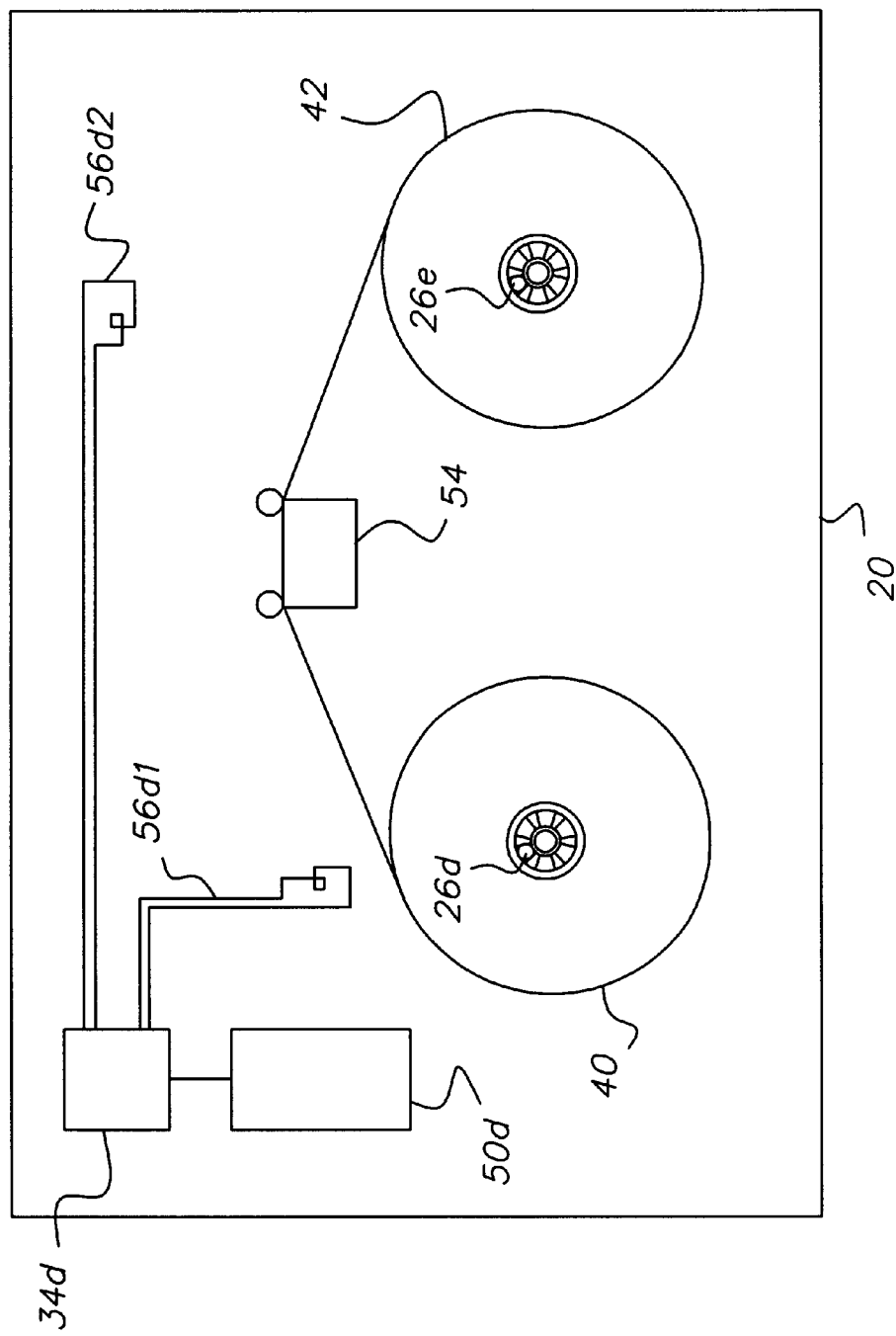
FIG. 6 is a side view showing a telecine apparatus adapted for use in accordance with the invention.

Referring to FIG. 6, the film on take-up reel 40 serves as the supply reel to telecine apparatus 20. A telecine apparatus control logic processor 50d instructs a telecine apparatus transceiver 34d, using an antenna 56d1, to read stored data from reel 40 transponder 26d. Telecine apparatus control logic processor 50d, based on this stored data, is capable of adjusting operation of telecine apparatus 20. Telecine reader head 54 operates as the film processing subsystem for telecine apparatus 20, reading the film image as it is fed from reel 40. The stored information may also include instructions from the cinematographer that can be used by the operator of telecine apparatus 20 as input in producing the final, edited color image. Telecine apparatus control logic processor 50d can then record additional data from telecine operation back onto reel 40 transponder 26d and, using an antenna 56d2, can record useful data onto a transponder 26e that is attached to a telecine take-up reel 42.

Figure 7:
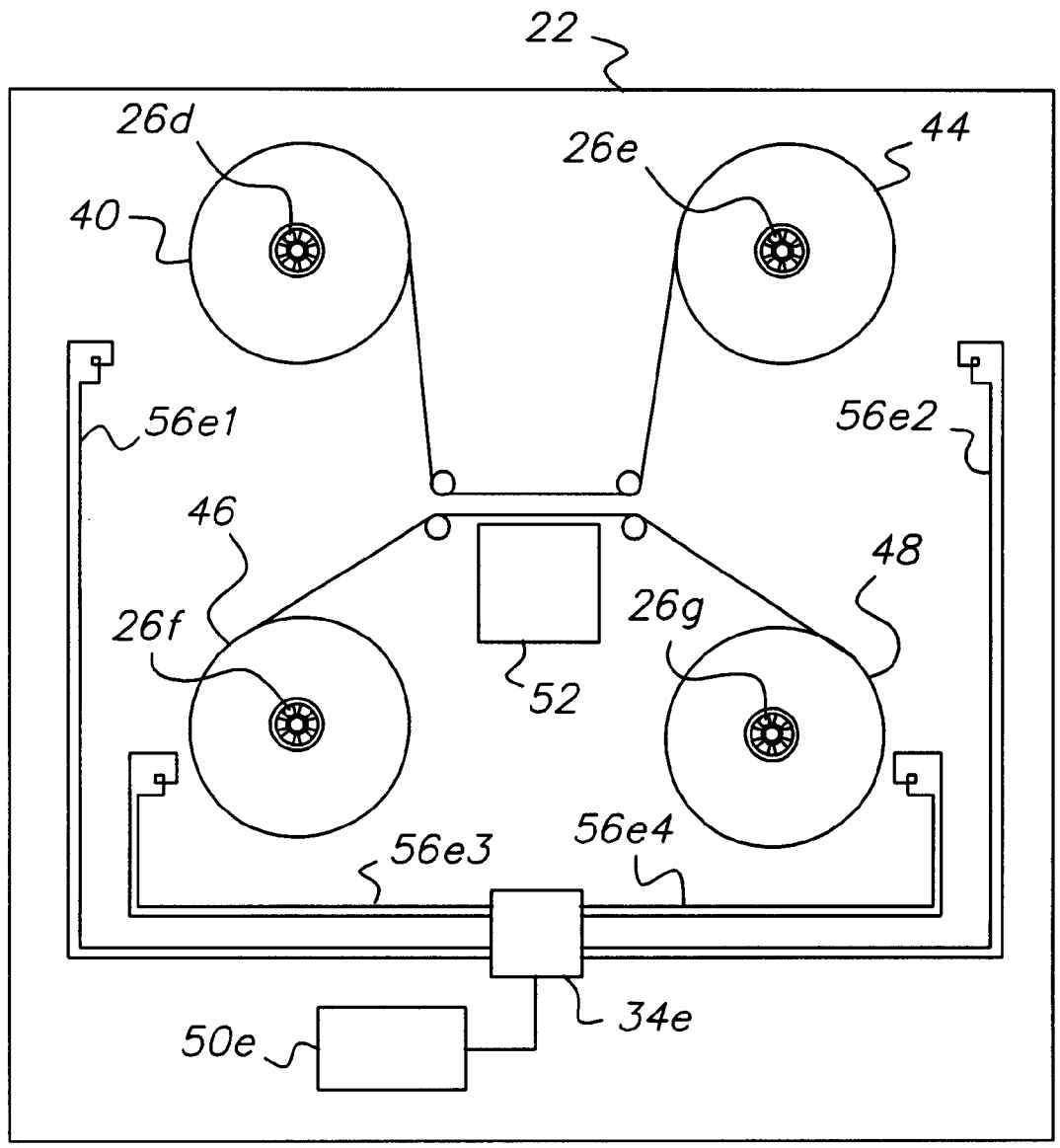
FIG. 7 is a side view showing a film printing apparatus adapted for use in accordance with the invention.

Referring to FIG. 7, the film on take-up reel 40 can be used as input to film printing apparatus 22. A film printing apparatus control logic processor 50e instructs a film printing apparatus transceiver 34e, using an antenna 56e1, to read stored data from take-up reel transponder 26d. Film printing apparatus control logic processor 50e, based on this stored data, is capable of adjusting operation of film printing apparatus 22. In this apparatus, a raw stock supply reel 46 can be used to contain an intermediate or print film used in the post-production operation for generation of print dailies, interpositives, internegatives, and work and release prints. An exposure subsystem 52 exposes the film from raw stock supply reel 46, which is then wrapped onto an imaged unprocessed take-up reel 48. The processed film from reel 40 is routed through exposure subsystem 52 and wrapped onto printing apparatus take-up reel 44. Film printing apparatus control logic processor 50e, using transceiver 34e and an antenna 56e2, can transfer data from reel 40 transponder 26d onto a printing apparatus take-up reel 44 transponder 26e. A raw stock supply reel 46 transponder 26f can be read by film printing apparatus control logic processor 50e using transceiver 34e and an antenna 56e3 to obtain stored information on the specific film type and its manufacture characteristics. An imaged unprocessed take-up reel 48 transponder 26 g can be accessed by film printing apparatus control logic processor 50e using transceiver 34e and an antenna 56e4 to record information useful for the final print. This can include, for example, cumulative data obtained from print processing at each stage and apparatus in imaging chain 10 and read from transponder 26d and transponder 26f.

The invention is particularly applicable to a multistage film processing system wherein a first film processing subsystem is performed comprising exposure of a photographic film in a motion picture camera wherein camera report information is recorded in the memory coupled with a first transponder, a second film processing subsystem is performed comprising photographic development of the exposed photographic film, and a subsequent film processing subsystem is performed wherein exposed and developed photographic film is read in a telecine transfer device or is printed onto a motion picture intermediate or print film, where the camera report information recorded in the first transponder is transferred to a transponder associated with the photographic film supply reel for the telecine transfer device or the photographic film supply reel for the printing subsystem and is used to control the telecine transfer or printing process, eliminating the need for relianc on written camera reports for such operations.

Data Stored in Memory 36

Data can be stored in memory 36 in compressed form, allowing a substantial amount of information to be stored during each stage of imaging chain 10.

By way of example only, and not by way of limitation, the data stored in memory 36 attached to supply core transponder 26a for manufactured motion picture film may be any of the exemplary data displayed in Table 1 hereinbelow.

TABLE 1

Data Stored in Supply Core Transponder 26a for Unexposed Motion Picture Film

| Data Stored | Number of Bits | Description |
| --- | --- | --- |
| Product Code Identifier | 40 | 10-digit product code. (May not be required if Consumable Type Identifier provides enough data.) |
| Catalog Number | 64 | For example, 116 2866. |
| Manufacture Date | 16 | 16-bit encoded date. Includes 4-bit month, 5-bit day, 7-bit year components. |
| Batch Emulsion Data | 128 | Includes encoded batch number, sensitivity and response data from testing of samples, density benchmark data, sensitometry data obtained for the batch, recommended exposure index. |
| Sensitometric Data | 128 | Parameter values allowing characterization of sensitometric response for this film, including exposure/density reciprocity characteristics. |
| Roll Length | 16 | 16-bit encoded data on length of roll of film. |
| Correction Filter Data | 256 | Encoded recommendations for color balance correction filters, based on light source. |
| Performance Data | 512 | Key points for sensitometric curves, diffuse RMS granularity curves, modulation-transfer curves, spectral sensitivity response. |
| Test Data | 128 | Test data from quality assurance database, including variance measured from expected values, such as for spectral dye peaks. |

By way of example only, and not by way of limitation, the data stored in memory 36 on camera film take-up core transponder 26b that accompanies the exposed film from camera 30 can include any or all of the data from Table 1 with the addition of any of the exemplary data displayed in Table 2 hereinbelow.

TABLE 2

Additional Data Stored in Camera Film Take-up Core Transponder 26b

| Data Stored | Number of Bits | Description |
|---|---|---|
| Camera Report - Take | 256 | Encoded data giving the production number, scene number, scene description, preferred take number. |
| Camera Report - Exposure | 256 | Includes data giving T-stop value, Normal-/Over-/Under- exposure information, filter data, lighting color temperature, scene reference, camera speed. |
| Camera Report - Accounting | 512 | Encoded footage and frame count information for each take, special process instructions, transfer instructions, print instructions. |
| Camera Report - Telecine | 128 | Includes telecine transfer preferences and related information to support telecine colorist and operation. |

As Table 2 indicates, the added information stored on the exposed film can include any of the information that is currently expected on the camera report, described earlier, that is conventionally completed by the assistant cameraman.

By way of example only, and not by way of limitation, the data stored in take-up reel transponder 26d that accompanies the developed motion picture film that can then be input to telecine apparatus 20 or to film printing apparatus 22 can include any or all of the data from Tables 1 and 2 with the addition of any of the exemplary data displayed in Table 3 hereinbelow.

TABLE 3

Additional Data Stored in Take-up Reel Transponder 26d

| Data Stored | Number of Bits | Description |
|---|---|---|
| Camera Negative Film ID | 64 | Identifier for each C-N roll compiled into larger roll for processing. |
| Processing Data | 256 | Data on processing variables, including date and time, processing system, developer batch identification, timing settings, temperature readings. |

Additional data can be added by any of the apparatus that handle film in imaging chain 10 or separately by any individual who handles the film at any processing stage.

Tables 1, 2, and 3 above are intended as illustrative examples only. The actual arrangement of memory data is a factor of memory size (memory capacity of EEPROM devices can be expected to expand over the next few years) and is a factor of the data required to optimize processing by the various processing apparatus in imaging chain 10.

It should be noted that the data listed in Tables 1, 2, and 3 refer primarily to image processing variables. This information is in addition to identification and security information stored on each transponder 26a/b/c/d/e/f/g, as noted above. Response to stored data by processing apparatus in imaging chain 10 Performance of the various apparatus in imaging chain 10 can be varied in response to stored memory data on transponders 26a/b/c/d/e/f/g. As controlled using control logic processor 50a/b/c/d/e, operational variables such as timing, temperature, exposure levels, camera settings, and other parameters can be automatically adjusted to compensate or correct for the stored data. This is in addition to specific processing instructions that can be stored, such as from camera or direction personnel.

Significantly, the present invention does not require dimensional or structural changes to existing film packaging. As described above and illustrated in FIG. 2, transponder 26a/b/c/d/e/f/g can be inserted into existing film cores and spools without requiring any changes to the mechanical interface for film handling in any of the apparatus in imaging chain 10.

As is described hereinabove, the present invention allows film data to be attached to the film core, spool, or reel as the film is processed from manufacture to final print stages. This allows any adapted apparatus in imaging chain 10 to take advantage of the information available in order to provide improved processing.

It can be appreciated from the teachings above that the present invention offers significant advantages in eliminating manual data entry steps and its concomitant errors; in providing information about the film that persists as long as film remains wound on its spool, core, or reel; and in providing information that allows optimization of the processing operations for motion picture film, with corresponding gains in image quality and customer satisfaction and a decrease in waste. The present invention provides these and other advantages without requiring redesign of film packaging, cores, spools, or reels and without requiring retrofit of existing apparatus for customers who may not yet be ready to make the minimal investment required to benefit from this invention.

The invention allows a wide range of possibilities for including a transponder attached to the film packaging, not limited to the preferred embodiments outlined herein. The transponder could, for example, be attached to a film spool in some alternate fashion without departing from the scope or spirit of the invention. Different types of transponders could be used to store film information, tailored to suit film packaging at any stage in imaging chain 10.

As another example, alternate components and methods could be used to optimize communication between transceiver 34a/b/c/d/e and transponders 26a/b/c/d/e/f/g, including RF amplifiers or use of RF shielding or mechanical articulation of film carriers or antenna structures. Data structures, memory component types, and types of data stored may vary significantly from those described here. Transponder 26a/b/c/d/e/f/g could be battery-powered or could use some other source of power. First and second electromagnetic fields 64 and 66 could employ RF frequencies or use other frequencies in the electromagnetic energy spectrum.

This invention also allows the use of transceivers not incorporated into processing apparatus. For example, a hand-held transceiver unit could be used at any stage in imaging chain 10 to access memory 36 in transponder 26a/b/c/d/e/f/g that accompanies the film. This arrangement could be used to allow voice or text data to be stored as instructions from a cinematographer after a film session, for example. A hand-held transceiver unit could also be used to identify one film reel removed from a set of film reels or to automate the indexing and accounting of multiple film reels stored in the same area.

While the invention has been described with particular reference to its preferred embodiments, it will be understood by those skilled in the art that various changes may be made and equivalents may be substituted for elements of the preferred embodiments without departing from the spirit and scope of the invention. While the invention has been particularly described in connection various stages in the production of a motion picture film, for which recording, tracking of and access to information based upon previous processing steps is particularly useful, it will be understood that the invention is generally applicable to multistage processing of photographic films in general where it would be useful to transfer information with film as it proceeds from stage to stage, such as for splicing, development, and printing of still camera film.

PARTS LIST

10. Imaging chain
12. Film manufacturing stage
14. Filming stage
16. Roll splicing and wind-up apparatus
18. Photoprocessing developer apparatus
20. Telecine apparatus
22. Film printing apparatus
24. Film core
26. Transponder
26a. Supply core transponder
26b. Camera film take-up core transponder
26c. Large take-up roll transponder
26d. Take-up reel transponder
26e. Printing apparatus take-up reel transponder
26f. Raw stock supply reel transponder
26g. Imaged unprocessed take-up reel transponder
28. Film magazine
30. Camera
32. Camera film take-up core
34a. Camera transceiver
34b. Roll splicing and wind-up apparatus transceiver
34c. Photoprocessing developer apparatus transceiver
34d. Telecine apparatus transceiver
34e. Film printing apparatus transceiver
36. Memory
38. Large take-up roll
40. Take-up reel
42. Telecine take-up reel
44. Printing apparatus take-up reel
46. Raw stock supply reel
48. Imaged unprocessed take-up reel
50a. Camera control logic processor
50b. Roll splicing and wind-up apparatus control logic processor
50c. Photoprocessing developer apparatus control logic processor
50d. Telecine apparatus control logic processor
50e. Film printing apparatus control logic processor
52. Exposure subsystem
54. Telecine reader head
56 Antenna
a1/
a2/
b1/
b2/
c1/
c2/
d1/
d2/
e1/
e2/
e3/
e4.
64. First electromagnetic field
66. Second electromagnetic field

What is claimed is:

1. A multistage system for processing photographic film comprising:
(a) a first film processing subsystem wherein photographic film is wound on a first film spool, which first film spool with wound photographic film is used as a supply spool for a subsequent film processing subsystem;
(b) a first transponder associated with the first film spool, said first transponder coupled with a memory having data stored therein indicative of film processing information, said first transponder capable of receiving a first electromagnetic field and generating a second electromagnetic field in response to the first electromagnetic field received thereby, the second electromagnetic field being characteristic of the data stored in the memory;
(c) a second film processing subsystem wherein film processed in the second film processing subsystem is wound on a second film spool;
(d) a second transponder associated with the second film spool, said second transponder coupled with a second memory capable of having data stored therein indicative of film processing information, said second transponder capable of receiving a third electromagnetic field and generating a fourth electromagnetic field in response to the third electromagnetic field received thereby, the fourth electromagnetic field being characteristic of the data stored in the second memory; and
(e) at least one transceiver for transmitting said first electromagnetic field and for sensing said second electromagnetic field, thereby allowing data to be read from the memory coupled with the first transponder, and for transmitting data read from the first transponder to the second transponder.

2. The system of claim 1, wherein said first and second transponders are coupled with read/write memories.

3. The system of claim 1, wherein said transceiver transmits the first electromagnetic field at a predetermined first radio frequency.

4. The system of claim 1, wherein said first transponder transmits the second electromagnetic field at a predetermined second radio frequency.

5. The system of claim 1, wherein the first film spool with wound photographic film is used as the supply spool for film processed in the second film processing subsystem.

6. The system of claim 1, wherein the first film spool with wound photographic film is used as the supply spool for one or more of a series of intermediate film processing subsystems performed between the first and second film processing subsystems wherein the film is transferred from a supply spool to a take-up spool in sequence for each intermediate subsystem, the take-up spool for each intermediate subsystem being used as the supply spool for the next subsystem, and where data read from the first transponder is rewritten on and reread from one or more intermediate transponders associated with each intermediate film spools used in sequence in the multistage system, thereby maintaining association of the data read from the first transponder with film transferred to take-up spools at the end of each film processing subsystem.

7. The system of claim 6, wherein additional data associated with an intermediate subsystem may be added to the data read from the first transponder and transmitted to the second transponder.

8. The system of claim 1, further comprising a third film processing subsystem wherein film wound on the second film spool at the end of the second film processing subsystem is used as the supply spool for the third film processing subsystem, where data stored in the second transponder is used to control the third film processing subsystem.

9. The system of claim 1, wherein the first and second film processing subsystems comprises stages of production of a motion picture film.

10. The system of claim 9, wherein the first film processing subsystem comprises exposure of a photographic film in a motion picture camera wherein camera report information is recorded in the memory coupled with the first transponder, the second film processing subsystem comprises photographic development of the exposed photographic film, and further comprising a subsequent film processing subsystem wherein exposed and developed photographic film is read in a telecine transfer device, where the camera report information recorded in the first transponder is transferred to a transponder associated with the photographic film supply reel for the telecine transfer device and is used to control the telecine transfer.

11. The system of claim 9, wherein the first film processing subsystem comprises exposure of a photographic negative film in a motion picture camera wherein camera report information is recorded in the memory coupled with the first transponder, the second film processing subsystem comprises photographic development of the exposed photographic negative film, and further comprising a subsequent film processing subsystem wherein exposed and developed photographic negative film is printed onto motion picture intermediate or print film, where the camera report information recorded in the first transponder is transferred to a transponder associated with the photographic negative film supply reel for the printing subsystem and is used to control the printing process.

12. The system of claim 1, wherein the first film processing subsystem comprises manufacture of the photographic film, and the first transponder memory includes recorded data supplied by the film manufacturer.

13. The system of claim 11, wherein the second film processing subsystem comprises exposure of the photographic film, and wherein exposure information is added to the data read from the first transponder and transmitted to the second transponder.

14. The system of claim 1, wherein the second film processing subsystem comprises photographic development of an exposed photographic film.

15. The system of claim 1, wherein the first film processing subsystem comprises exposure of the film, and said second film processing subsystem comprises film roll splicing and wind up of the film.

16. The system of claim 1, wherein the first film processing subsystem comprises exposure of the film, and said second film processing subsystem comprises photographic development of the exposed film.

17. The system of claim 1, wherein the first film processing subsystem comprises photographic development of exposed film, and said second film processing subsystem comprises printing of the developed film onto a second photographic film, wherein the second film spool is used as a take-up spool for the second photographic film.

18. The system of claim 1, wherein additional data associated with the second processing subsystem may be added to the data read from the first transponder and transmitted to the second transponder.

19. A method for recording, accessing, and transmitting information during multiple stages of a photographic film processing system comprising the steps of:

(a) performing a first film processing step wherein photographic film is wound on a first film spool, which first film spool with wound photographic film is used as a supply spool for a subsequent film processing step;

(b) recording data indicative of film processing information in a memory coupled with a first transponder associated with the first film spool, said first transponder capable of receiving a first electromagnetic field and generating a second electromagnetic field in response to the first electromagnetic field received thereby, the second electromagnetic field being characteristic of the data stored in the memory;

(c) performing a second film processing step wherein film processed in the second film processing step is wound on a second film spool, where the second film spool has a second transponder associated therewith, said second transponder coupled with a second memory capable of having data stored therein indicative of film processing information, said second transponder capable of receiving a third electromagnetic field and generating a fourth electromagnetic field in response to the third electromagnetic field received thereby, the fourth electromagnetic field being characteristic of the data stored in the second memory;

(d) reading data from the memory coupled with the first transponder with a transceiver which transmits said first electromagnetic field and which senses said second electromagnetic field, thereby allowing data to be read; and (e) writing data received from said first transponder to said second transponder.

20. A method for recording, accessing, and transmitting information concerning motion picture film processing, whereby said information can be used to alter the operation of a motion picture film processing apparatus, comprising the steps of:

(a) performing a first film processing step wherein photographic film is wound on a first film spool, which first film spool with wound photographic film is used as a supply spool for a subsequent film processing step;

(b) recording data indicative of film processing information in a memory coupled with a first transponder associated with the first film spool, said first transponder capable of receiving a first electromagnetic field and generating a second electromagnetic field in response to the first electromagnetic field received thereby, the second electromagnetic field being characteristic of the data stored in the memory;

(c) performing a second film processing step wherein film processed in the second film processing step is wound on a second film spool, where the second film spool has a second transponder associated therewith, said second transponder coupled with a second memory capable of having data stored therein indicative of film processing information, said second transponder capable of receiving a third electromagnetic field and generating a fourth electromagnetic field in response to the third electromagnetic field received thereby, the fourth electromagnetic field being characteristic of the data stored in the second memory;

(d) reading data from the memory coupled with the first transponder with a transceiver which transmits said first electromagnetic field and which senses said second electromagnetic field, thereby allowing data to be read;

(e) writing data received from said first transponder to said second transponder; and (f) performing a subsequent film processing step wherein data written in the second transponder is used to control the subsequent step.

* * * * *